(12) United States Patent
Ravishankar et al.

(10) Patent No.: US 10,519,387 B2
(45) Date of Patent: Dec. 31, 2019

(54) CATALYST COMPOSITION FOR CONVERTING LIGHT NAPHTHA TO AROMATIC COMPOUNDS AND A PROCESS THEREOF

(71) Applicant: Hindustan Petroleum Corporation Ltd, Mumbai, Maharashtra (IN)

(72) Inventors: Raman Ravishankar, Bangalore (IN); Peddy Venkat Chalapathi Rao, Bangalore (IN); Nettem Venkateswarlu Choudary, Bangalore (IN); Ganapati V. Shanbhag, Bangalore (IN); Hodala Lakshminarayan Janardhan, Bangalore (IN); Anand B. Halgeri, Bangalore (IN); Sriganesh Gandham, Bangalore (IN)

(73) Assignee: HINDUSTAN PETROLEUM CORPORATION LTD., Mumbai (IN)

( * ) Notice: Subject to any disclaimer, the term of this patent is extended or adjusted under 35 U.S.C. 154(b) by 218 days.

(21) Appl. No.: 15/129,376

(22) PCT Filed: Aug. 25, 2014

(86) PCT No.: PCT/IB2014/064041
§ 371 (c)(1),
(2) Date: Sep. 26, 2016

(87) PCT Pub. No.: WO2015/150881
PCT Pub. Date: Oct. 8, 2015

(65) Prior Publication Data
US 2017/0114288 A1    Apr. 27, 2017

(30) Foreign Application Priority Data
Mar. 31, 2014    (IN) .......................... 1235/MUM/2014

(51) Int. Cl.
C10G 35/095 (2006.01)
B01J 37/28 (2006.01)
(Continued)

(52) U.S. Cl.
CPC .......... *C10G 35/095* (2013.01); *B01J 29/061* (2013.01); *B01J 29/076* (2013.01); *B01J 29/40* (2013.01);
(Continued)

(58) Field of Classification Search
None
See application file for complete search history.

(56) References Cited

U.S. PATENT DOCUMENTS 4,735,929 A * 4/1988 Bakas ...................... B01J 29/22
502/66
5,510,306 A    4/1996 Murray
(Continued)

FOREIGN PATENT DOCUMENTS

EP    0130251 B1    1/1985

OTHER PUBLICATIONS

International Search Report for International application No. PCT/1814/64041Da~e of mailing of the ISR dated Jan. 5, 2015.

*Primary Examiner* — Melissa S Swain
(74) *Attorney, Agent, or Firm* — Maschoff Brennan

(57) ABSTRACT

Accordingly, the present invention provides a catalyst composition suitable for converting light naphtha comprising one or more of C5 to C8 carbon atoms to aromatic compounds ranging from C6 to C10 carbon atoms, said catalyst composition comprising: (a) a medium pore size zeolite; (b) 0.1 to 5.0 wt % of zinc; and (c) 0.1 to 5 wt % of gallium. Also, the present invention provides a process for converting light naphtha comprising one or more of C5 to C8 carbon atoms to aromatic compounds ranging from C6 to C10

(Continued)

carbon atoms, said process comprising the step of contacting a feedstock comprising the light naphtha with a catalyst composition comprising (a) a medium pore size zeolite; (b) 0.1 to 5.0 wt % of zinc; and (c) 0.1 to 5 wt % of gallium in presence of carrier gas at temperatures ranging from 400° to 600° C.

10 Claims, 1 Drawing Sheet

(51) Int. Cl.
*B01J 29/40* (2006.01)
*B01J 29/87* (2006.01)
*B01J 29/06* (2006.01)
*B01J 29/076* (2006.01)
*B01J 29/08* (2006.01)

(52) U.S. Cl.
CPC ............. *B01J 29/405* (2013.01); *B01J 29/87* (2013.01); *B01J 37/28* (2013.01); *B01J 29/088* (2013.01); *B01J 2229/183* (2013.01); *B01J 2229/186* (2013.01); *B01J 2229/42* (2013.01); *C10G 2400/30* (2013.01)

(56) References Cited

U.S. PATENT DOCUMENTS

| | | |
|---|---|---|
| 5,961,818 A | 10/1999 | Pradhan et al. |
| 8,419,929 B2 | 4/2013 | Ding |
| 8,471,083 B2 | 6/2013 | Chen et al. |
| 2010/0022810 A1* | 1/2010 | Sekiguchi ................ B01J 29/44 585/314 |
| 2010/0234657 A1* | 9/2010 | Takamatsu ............. B01J 29/061 585/419 |
| 2011/0201860 A1* | 8/2011 | Akhtar ..................... B01J 21/04 585/419 |
| 2013/0158323 A1* | 6/2013 | Mondal .................... B01J 29/40 585/408 |
| 2013/0261363 A1 | 10/2013 | Serban et al. |

\* cited by examiner

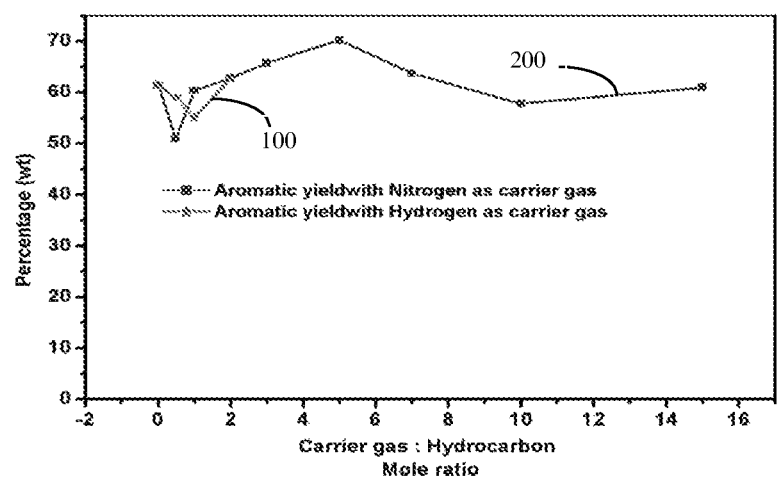

CATALYST COMPOSITION FOR CONVERTING LIGHT NAPHTHA TO AROMATIC COMPOUNDS AND A PROCESS THEREOF

FIELD OF THE INVENTION

The invention relates to the field of catalyst composition for use in converting light naphtha into aromatic compounds. Also, the invention provides a process for converting light naphtha into aromatic compounds.

BACKGROUND OF THE INVENTION

In a conventional petroleum or petrochemical refinery process and system, crude feedstock is processed by a crude distillation unit. The crude feedstock may comprise crude oil and/or feedstock having undergone partial processing ("intermediate refinery feedstock"). The crude distillation unit produces a naphtha fraction, together with a number of other fractions useful in production of refined oil products, for example, gasoline, jet fuel, diesel, etc., and fractions useful for the production of specialty chemicals.

Naphtha is mainly a mixture of straight-chain, branched and cyclic aliphatic hydrocarbons. The naphtha fraction is primarily composed of paraffins, olefins, naphthenes and aromatics. Paraffins are alkane hydrocarbons of general formula $C_nH_{2n+2}$ which may be substituted, and wherein n is a whole number; e.g., from 1-14. The term "paraffins" is also generally understood to include isoparaffins. Olefins are hydrocarbons having at least one carbon-carbon double bond, such as an alkenes of general formula $C_nH_{2n}$ which may be substituted and wherein n is a whole number; e.g., from 2-14. The olefin fraction ma also comprise alkynes of general formula $C_nH_{2n-2}$ which may be substituted and wherein n is a whole number—e.g., from 2-14. When n is greater than 12, the fraction may be referred to as distillates; e.g., jet fuel, diesel, etc. Higher n fractions may be usefill for other purposes. Olefins (including substituted olefins) where n=12-14 may be found in both the naphtha fraction and the distillates fraction. The naphthenes include cycloalkanes and alkyl substituted cycloalkanes. Many naphthenes are chemical precursors to the aromatics. The aromatics found in a petroleum or petrochemical feedstock include a range of conjugated hydrocarbon rings and alkyl substituted conjugated hydrocarbon rings.

The whole range naphtha fraction from the crude distillation unit is processed in a naphtha splitter producing an overhead stream (typically referred to as a Light Straight Run or LSR or simply light naphtha), and a bottoms stream of heavy naphtha. Naphtha is generally divided into light Naphtha having from five to nine carbon atoms per molecule and heavy naphtha having from seven to twelve carbons per molecule.

The light naphtha is rich in paraffins, and the heavy naphtha is rich in naphthenes and aromatics. Typically, light naphtha contains naphthenes, such as cyclohexane and methylcyclopentane, and linear and branched paraffins, such as hexane and pentane. Light naphtha typically contains 60% to 99% by weight of paraffins and cycloparaffins. Light naphtha can be characterized as a petroleum distillate having a molecular weight range between about 70 grams per mole (g/mol) and about 150 g/mol, a specific gravity range between about 0.6 grams per cubic centimeter (g/cm$^3$) and about 0.9 g/cm$^3$, a boiling point range between about 50° F. and about 320° F. and a vapor pressure between about 5 millimeter mercury (mm Hg) (torr) and about 500 mm Hg (torr) at room temperature. Light naphtha may be obtained from crude oil, natural gas condensate or other hydrocarbons streams by a variety of processes, e.g., distillation.

The heavy naphtha bottoms stream is hydrotreated to remove sulphur and other contaminants, obtaining a sweet naphtha, which is fed to a naphtha reformer where it may be combined with other intermediate sweet naphtha streams, for example, sweet natural gas condensates and hydrocracker naphtha. In the naphtha reformer, the naphtha components are reformulated into components of a gasoline product.

A naphtha reformer is usually a high severity reformer, which produces aromatics, including benzene, toluene and xylenes ("BTX"), as well as other aromatics that enable the reformate to have an octane quality sufficient to meet gasoline octane specifications. Benzene, toluene and xylenes may all also be used in the production of petrochemical derivatives. Of the xylenes that may be used in the production of petrochemical derivatives, para- and ortho-xylene are worth particular mention, although meta-xylenes may also be of value.

High severity reformers are run at high temperatures (e.g., inlet temperatures of about 900 degrees Fahrenheit-around 480 degrees Celsius—or greater) with commercially available catalyst, and have long residence times. The residence time is a factor of the number of reactors and the amount of catalyst involved. High severity reformers typically involve four or five reactors in series. Also, at each reactor, heating to the noted inlet temperature is required in order to produce the desired gasoline products. High severity reformers are associated with high operating costs and may result in a significant volume loss across reactors of high economic value gasoline components.

U.S. Pat. No. 2,914,460 discloses reforming of hydrocarbons and particularly to an improved method for the aromatization of light naphtha fractions to produce a highly aromatic high octane product. The document teaches catalysts containing 0.01 to 1.0 wt. percent platinum or 0.1 to 2.0 wt. percent palladium dispersed upon a highly pure alumina support such as is obtained from aluminum alcoholate or from an alumina hydrosol prepared by hydrolyzing aluminum metal with dilute acetic acid in the presence of very small catalytic amounts of mercury as suitable for hydroforming the light naphthas.

U.S. Pat. No. 3,003,948 discloses a process for decontamination of naphthas and the reforming of the decontaminated naphthas over a platinum group metal reforming catalyst and, more particularly to the decontamination over a first catalyst, dehydrogenation over a platinum-group metal catalyst, and aromatization of the dehydrogenated naphtha over the aforesaid first catalyst. In a preferred aspect, the document teaches a catalyst comprising oxides of chromium, molybdenum, and aluminum as the first catalyst.

U.S. Pat. No. 3,843,741 discloses a process of converting an aliphatic feedstock having an atmospheric boiling point of up to about 400° F. to aromatic hydrocarbons by contacting such feedstock with a ZSM-S type of zeolite at about 500° to 1500° F. and a space velocity of up to about 15 WHSV, Particularly, the document discloses use of a catalyst comprising a matrix of ZSM-5 type of crystalline zeolite and a second, inorganic component consisting essentially of at least about 80 weight percent silica. In a preferred aspect, the zeolite is Zn ZSM-5 or Zn Cu ZSM-5.

U.S. Pat. No. 5,037,529 discloses a dual stage reforming process comprising: (a) contacting a feed containing a straight chain paraffin containing 6 to 12 carbon atoms with a non-acidic catalyst, under dehydrocyclization conditions, where said catalyst comprises two components one of which two components is a non-acidic medium pore zeolite containing a modifier selected from the group consisting of tin, indium and thallium and a second of which two components is a reforming dehydrogenation/hydrogenation metal and producing an effluent (1) which has an aromatic content greater than that of the feed and (2) which comprises olefins produced under said dehdrocyclization conditions; (b) contacting the effluent with an acidic catalyst comprising a zeolite having a constraint index of 1 to 12, under conditions of temperature ranging from 400 atmospheric to 500 psig, a liquid hourly space velocity 0.1 to 10 and a hydrogen cofeed to effluent ratio of 0 to 10:1, to convert said olefins to gasoline to produce a reformate which has an aromatic content greater than that of the effluent or has an RON greater than that of the effluent or has both.

U.S. Pat. No. 5,200,375 discloses a process for regenerating a coked monofunctional catalyst composition resulting from catalysis in dehydrogenation and/or dehydrocyclization, wherein the coked monofunctional catalyst composition comprises a dehydrogenation/hydrogenation metal and a non-acidic microporous crystalline material wherein the dehydrogenation/hydrogenation metal is present in an amount which ranges from 0.1 to 20 weight percent; wherein said material contains 0.1 to 20 weight percent of tin, indium, thallium or lead; wherein the microporous crystalline material has an X-ray diffraction pattern of a zeolite which is selected from the group consisting of ZSM-5, ZSM-11, ZSM-12, ZSM-22, ZSM-23, ZSM-35, ZSM-48 and ZSM-50.

U.S. Pat. No. 5,658,453 discloses a process for selectively upgrading a naphtha feedstock comprising the steps of: (a) contacting the feedstock with an aromatization catalyst in an aromatization zone in the presence of hydrogen at aromatization conditions including a pressure of from atmospheric to below 10 atmospheres, a temperature of from 260 space velocity of from about 0.5 to 40 hr.sup.-1 to obtain an aromatization effluent stream; (b) separating the aromatization effluent stream to obtain a hydrogen-rich gas and an aromatics-rich intermediate stream containing a small proportion of olefins and dissolved hydrogen-containing gas; (c) contacting the aromatics-rich intermediate stream and a portion of the hydrogen-rich gas to provide a molar ratio of hydrogen to the intermediate stream of from about 0.005 to 0.08 in a selective saturation zone with a saturation catalyst comprising a platinum-group metal component and a refractory inorganic oxide at saturation conditions including a pressure of from about 100 kPa to 10 MPa, a temperature of from about 30 300 hr.sup.-1 to saturate at least about 70% of the contained olefins and less than about 1% of the aromatics and obtain a saturated effluent containing trace residual hydrogen-containing gas; and, (d) stabilizing the saturated effluent in a fractionator to remove trace residual hydrogen-containing gas and to obtain a stabilized aromatics-rich product.

U.S. Pat. No. 6,063,724 discloses a catalyst which effectuates the aromatization, reformation, and dehydrogenation of aliphatic, cycloaliphatic, and mixtures of aliphatic and cycloaliphatic hydrocarbons. The catalyst comprises an L-zeolite associated with a Group VIII metal such as platinum and having a rare earth metal ion incorporated therein. Particularly, the document discloses a catalytic material prepared by the process comprising the steps of: providing an L-zeolite; calcining the L-zeolite so as to substantially remove water, thereby providing a substantially anhydrous L-zeolite; incorporating the substantially anhydrous L-zeolite with at least one rare earth ion, thereby providing a rare earth ion incorporated L-zeolite; calcining the rare earth ion incorporated L-zeolite, thereby providing a calcined rare earth ion incorporated L-zeolite; and associating a Group VIII metal with the calcined rare earth modified L-zeolite thereby providing a catalytic material.

U.S. Pat. No. 6,190,534 discloses a process fir selectively upgrading a naphtha feedstock to obtain an aromatics-rich product having an increased octane number comprising the steps of: (a) contacting the naphtha feedstock in an olefin-forming zone with a nonacidic, non-zeolitic olefin-forming catalyst, comprising at least one platinum-group metal component and a nonacidic support, at olefin-forming conditions comprising a temperature of from about 350 to 650° C., pressure of from about 100 kPa to 4 MPa and liquid hourly space velocity of from about 0.1 to 100 hr$^{-1}$ to dehydrogenate paraffins without substantial dehydrocyclization and produce an olefin-containing intermediate stream; and, (h) converting the olefin-containing intermediate stream to yield aromatics in an aromatization zone maintained at aromatization conditions comprising a temperature of from about 260 to 560° C., pressure of from about 100 kPa to 4 MPa and liquid hourly space velocity of from about 0.5 to 40 hr$^{-1}$ in the presence of free hydrogen with a solid acid aromatization catalyst comprising a supported platinum-group metal component and recovering the aromatics-rich product.

U.S. Pat. No. 6,245,724 discloses reforming naphtha-containing hydrocarbon feedstreams wherein a naphtha stream containing at least about 25 wt % of $C_5$ to $C_9$ aliphatic and cycloaliphatic hydrocarbons is contacted with a modified reforming catalyst, e.g. ZSM-5, containing a dehydrogenation metal, e.g. zinc, which has been modified by contact with Group IIA alkaline earth metal, e.g. barium, or with an organosilicon compound in an amount sufficient to neutralize at least a portion of the surface acidic sites present on the catalyst. The resulting reformats contains a reduced content of $C_1$ to $C_4$ gas and a $C_8$ aromatic fraction having an enhanced content of para-xyelene.

U.S. Pat. No. 8,362,310 discloses a hydrocarbon aromatization process comprising: adding a nitrogenate to a hydrocarbon stream to produce an enhanced hydrocarbon stream, wherein the hydrocarbon stream is substantially free of sulfur and wherein the nitrogenate comprises ammonia or one or more ammonia precursors that form ammonia in the reaction zone; contacting the enhanced hydrocarbon stream with an aromatization catalyst in a reaction zone, wherein the aromatization catalyst comprises a non-acidic L-zeolite support, platinum, and one or more halides; and recovering an effluent comprising aromatic hydrocarbons.

U.S. Pat. No. 8,419,929 discloses a naphtha productive aromatic hydrocarbon reforming system, which comprises a heating device and a reaction device connected with the heating device and is Characterized in that the bottom part of the reaction device is connected with a high-pressure separator, the high-pressure separator is connected with a stabilizer system and also connected with a feedstock supply system and a compressor; the lower part of the stabilizer system is connected with an extraction system, which is adapted to extract a mixed aromatic hydrocarbon from a stabilized hydrocarbon to form a raffinate oil stream and a mixed hydrocarbon stream, the extraction system is connected with a raffinate oil cutting system, which is adapted to separate the raffinate oil stream into 3 cuts, and, a light raffinate oil is recovered by the upper part of the raffinate oil cutting system, the middle part of the raffinate oil cutting system is connected with another reaction device (a reaction device) and the heating device, and coal oil is directly recovered by the lower part of the raffinate oil cutting system; and the other end of another reaction device is connected with a cooling device and the high-pressure separator. The document suggests use of platinum/rhenium catalysts in the aforesaid process.

U.S. Pat. No. 8,471,083 discloses a process for producing para-xylene comprising the steps of: (a) contacting a hydrocarbonaceous feed wherein at least 50 wt. % of said feed boils above 550° C., in a first reaction zone comprising a hydrocracking catalyst under hydrocracking conditions to form an effluent; (b) separating the effluent into at least a $C_8$ containing fraction comprising at least 10 wt. % $C_8$ paraffinic hydrocarbons; (c) providing the $C_8$ containing fraction to a second reaction zone; (d) contacting the $C_8$ containing fraction under reforming reaction conditions with a reforming catalyst comprising a medium pore zeolite having a silica to alumina molar ratio of at least 200, a crystallite size of less than 10 microns and an alkali content of less than 5000 ppm in a second reaction zone to produce a product stream comprising para-xylene and meta-xylene wherein the para-xylene to meta-xylene ratio is at least 0.9; and (e) separating the para-xylene from the product stream. Particularly, the document states that the use of a low acidity medium pore zeolite catalyst with a silica to alumina ratio of at least about 40 to 1, increases the yield of para-xylene from a given $C_8$ paraffinic feedstock.

U.S. Patent Publication No. 2013/0261363 discloses a catalyst for catalytic reforming of naphtha, comprising: a) a noble metal comprising one or more of platinum, palladium, rhodium, ruthenium, osmium, and iridium; b) one or more alkali metals or one or more alkaline-earth metals from Groups 1 or 2 of the Periodic Table; c) a lanthanide-series metal comprising one or more elements of atomic numbers 57-71 of the Periodic Table; and d) a support; wherein an average bulk density of the catalyst is about 0.300 to about 1.00 gram per cubic centimeter, a noble metal content less than about 0.6 wt %, an alkali metal content of about 50 to about 1000 wppm, or an alkaline earth metal content of about 250 to about 5000 wppm, and a lanthanide-series metal content of about 0.05 to about 2 wt %.

Given the aforesaid state of the art, it can be said that there is a constant need to provide improved catalysts. More particularly, there is a need to provide catalysts which can improve the yield of aromatic compounds during the processing of light naphtha and especially, increase the yield of toluene. Additionally, there is a need to increase in the yield of dry gas, a quantum of C3 fraction.

SUMMARY OF THE INVENTION

Accordingly, the present invention provides a catalyst composition for converting light naphtha comprising one or more of C5 to C8 carbon atoms to aromatic compounds ranging from C6 to C10 carbon atoms, said catalyst composition comprising (a) a medium pore size zeolite; (b) 0.1 to 5.0 wt % of zinc; and (c) 0.1 to 5 wt % of gallium.

In accordance with another embodiment, the present invention provides a process for converting light naphtha comprising one or more of C5 to C8 carbon atoms to aromatic compounds ranging from C6 to C10 carbon atoms, said process comprising the step of contacting a feedstock comprising the light naphtha with a catalyst composition comprising (a) a medium pore size zeolite; (b) 0.1 to 5.0 wt % of zinc; and (c) 0.1 to 5 wt % of gallium in presence of a carrier gas at temperatures ranging from 400° to 600° C.

BRIEF DESCRIPTION OF THE ACCOMPANYING DRAWINGS

In the drawings accompanying the specification,

FIG. 1 illustrates a graph showing the variation in terms of production of aromatic yield for different ratios of carrier gas to hydrocarbon feedstock, more particularly, curve 100 shows the variation in terms of production of aromatic yield for different ratios of hydrogen to hydrocarbon feedstock, when hydrogen is used as the carrier gas and curve 200 shows the variation in terms of production of aromatic yield for different ratios of nitrogen to hydrocarbon feedstock, when nitrogen is used as the carrier gas.

DETAILED DESCRIPTION OF THE INVENTION

While the invention is susceptible to various modifications and alternative forms, specific embodiment thereof will be described in detail below. It should be understood, however that it is not intended to limit the invention to the particular forms disclosed, but on the contrary, the invention is to cover all modifications, equivalents, and alternative falling within the scope of the invention as defined by the appended claims.

The embodiments disclosed herein can provide a catalyst composition suitable for reforming and more particularly for converting light naphtha comprising one or more of C5 to C8 carbon atoms to aromatic compounds ranging from C6 to C10 carbon atoms, said catalyst composition comprising (a) a medium pore size zeolite; (b) 0.1 to 5.0 wt % of zinc; and (c) 0.1 to 5 wt % of gallium.

In an embodiment of the present invention, the medium pore size zeolite is hydrogen form medium pore alumnio silicate zeolite.

In another embodiment of the present invention, the hydrogen form medium pore alumino silicate zeolite has silica to alumina ratio (SAR) in the range of 20 to 200.

In yet another embodiment of the present invention, the medium pore size zeolite is hydrogen form medium pore gallium silicate molecular sieve.

In still another embodiment of the present invention, the catalyst composition optionally further comprises one or more optional promoters selected from the group comprising of Cerium, Chromium, Tin, Cesium, potassium, magnesium, molybdenum and mixtures thereof.

In a further embodiment of the present invention, wherein the one or more optional promotes are present in an amount of 0.5 to 1.5 wt %.

In a furthermore embodiment of the present invention, wherein the catalyst composition optionally further comprises a binder material and a filler material.

In another embodiment of the present invention, wherein the binder is selected from a group comprising of alumina, silica, silica-alumina and phosphate.

In yet another embodiment of the present invention, wherein the filler is selected from a group comprising of kaolin clay, montmorillonite clay, bentonites clay, laolinite clay and halloysite clay, aluminum trihydrate, baverite, and gamma alumina.

In a further embodiment of the present invention, wherein the catalyst is in the form of spheres, rods, pills, pellets, tablets, granules, cylindrical or multi lobe extrudates.

In another embodiment of the present invention, the medium pore size alumnio silicate zeolite has a pore size of about 5-6 Å.

In yet another embodiment of the present invention, the catalyst has 0.5 to 4.0 wt % of zinc and 0.5 to 4.0 wt % of gallium.

In still another embodiment of the present invention, the catalyst has 1.0 to 3.0 wt % of zinc and 1.0 to 4.0 wt % of gallium.

The present invention also provides a process for converting light naphtha comprising one or more of C5 to C8 carbon atoms to aromatic compounds ranging from C6 to C10 carbon atoms, said process comprising the step of contacting a feedstock comprising the light naphtha with a catalyst composition comprising (a) a medium pore size alumino silicate zeolite; (b) 0.1 to 5.0 wt % of zinc; and (c) 0.1 to 5 wt % of gallium in presence of carrier gas at temperatures ranging from 400° to 600° C.

In an embodiment of the present invention, wherein the catalyst is maintained in a fixed bed of a down-flow reactor.

In another embodiment of the present invention, wherein a weight hourly space velocity (WHSV) in the range of 0.5 to 2 hour$^{-1}$ is maintained.

In yet another embodiment of the present invention, wherein carrier gas comprises nitrogen, hydrogen or mixtures thereof.

In still another embodiment of the present invention, wherein the carrier gas is supplied in an amount of about 1 to about 20 moles per mole of hydrocarbon feed.

In a further embodiment of the present invention, wherein the carrier gas is supplied in an amount of about 2 to about 10 moles per mole of hydrocarbon feed.

As used herein, the term "zeolite" relates to an aluminosilicate molecular sieve or zeolite which has been obtained by selective removing from the aluminosilicate molecular sieve alumina and replacing the same with gallium. An overview of their characteristics is for example provided by the chapter on Molecular Sieves in Kirk-Othmer Encyclopedia of Chemical Technology, Volume 16, p 811-853; in Atlas of Zeolite Framework Types, 5th edition, (Elsevier, 2001). The term "medium pore sized zeolite" as used herein is very well-known in the art; see e.g. Holderich et al. (1988) Angew. Chem. Int. Ed. Engl. 27:226-246. Accordingly, a medium pore size zeolite is a zeolite having a pore size of about 5-6 Å. Suitable medium pore size zeolites are 10-ring zeolites, i.e. the pore is formed by a ring consisting of 10 SiO$_4$ tetrahedra. Large pore size zeolites have a pore size of about 6-8 Å and are of the 12-ring structure type. Zeolites of the 8-ring structure type are called small pore size zeolites. In the above cited Altlas of Zeolite Framework Types various zeolites are listed based on ring structure. Most preferably the zeolite is ZSM-5 zeolite, which is a well-known zeolite having MFT structure. ZSM-5 zeolite has an ellipsoidal pore size of 5.5×5.6 Å.

Preferably, the silica (SiO$_2$) to alumina (Al$_2$O$_3$) molar ratio of the zeolite is in the range of about 10-200. In the context of the present invention it was found that the performance and stability of the catalyst in the process of the present invention can be improved when the zeolite comprised in said catalyst has silica, to alumina molar ratio of about 20-200. Zeolites having silica to alumina molar ratio of 10-200 and preferably 20-200 are well known in the art and also are commercially available. Means and methods for quantifying the silica to alumina molar ratio of a zeolite are well known in the art and include, but are not limited to AAS (Atomic Absorption Spectrometer) or ICP (Inductively Coupled Plasma Spectrometry) analysis.

Preferably, the hydrocarbon feedstock is a naphtha feedstock including naphthenes and paraffins that boil within the gasoline range. The preferred feedstocks are naphthas consisting principally of naphthenes and paraffins, although, in many cases, aromatics will also be present. This preferred class includes straight-run gasolines, natural gasolines, and synthetic gasolines. Alternatively, it is frequently advantageous to charge thermally or catalytically cracked gasolines, partially reformed naphthas, or dehydrogenated naphthas. Mixtures of straight-run and cracked gasoline-range naphthas can also be used.

Sufficient hydrogen is supplied to provide an amount of about 1 to about 20, preferably about 2 to about 10, moles of hydrogen per mole of hydrocarbon feed entering the reforming zone.

Illustrative Embodiments

The following examples are intended to further illustrate the subject catalyst. These illustrations of embodiments of the invention are not meant to limit the claims of this invention to the particular details of these examples. In all of the following examples, the reactions were carried out at 500° C., with weight hourly space velocity of ~1 h$^{-1}$ using either nitrogen or hydrogen (as mentioned in specific examples) as carrier gas, with hydrocarbons ranging from C5 to C8 as feedstock or specific refinery product (light naphtha) as the feedstock. The catalyst loading ranged from 0.5 to 2 gm and specifically 1 g. The reactions were carried out in the fixed bed down-flow reactor with mass flow controllers, HPLC pump for feed injection and the outlet flow monitored by wetgas/rotameter. Products are analyzed through offline GC equipped with FID using TRWAX column of 60 m×0.25 um×2.5 mm. Gas samples were analysed by the GC with FID detector using Porapak Q packed column.

Example 1

The zeolite H-ZSM-5 with varying SiO2/Al2O3 ratios (SAR) were tested under the reaction conditions of: Temp.: 500° C., WHSV=1 h$^{-1}$, TOS=2 h. Catalyst: 2 g. H$_2$/HC=2 and the results are provided in Table 1. More particularly, as per example 1a, zeolite H-ZSM-5 with SAR of 23 was taken; as per example 1b, zeolite H-ZSM-5 with SAR of 30 was taken; as per example 1d, zeolite H-ZSM-5 with SAR of 80 was taken; as per example 1e, zeolite H-ZSM-5 with SAR of 84 was taken; and for example 1f, zeolite H-ZSM-5 had SAR of 187.

TABLE 1

| | Product distribution (wt %) | | | | | |
|---|---|---|---|---|---|---|
| | Ex. 1a | Ex. 1b | Ex. 1c | Ex. 1d | Ex. 1e | Ex. 1f |
| Methane | 7.27 | 8.82 | 5.67 | 2.59 | 2.32 | 0.74 |
| Ethylene | 1.15 | 1.29 | 1.65 | 3.93 | 3.12 | 1.140 |
| Ethane | 14.06 | 16.54 | 13.01 | 10.77 | 8.70 | 17.32 |
| Propylene + Propane | 56.92 | 57.30 | 59.54 | 50.11 | 48.39 | 3.69 |
| C4—HC | 8.67 | 7.69 | 12.04 | 25.94 | 28.06 | 5.67 |
| Hexane | 0.06 | 0.05 | 0.08 | 0.24 | 0.57 | 69.33 |
| Benzene | 2.90 | 2.32 | 1.82 | 0.83 | 0.50 | 0.99 |
| Toluene | 4.60 | 2.86 | 3.04 | 2.15 | 3.24 | 0.42 |
| Ethylbenzene | 0.21 | 0.13 | 0.15 | 0.12 | 0.29 | 0.00 |
| P-Xylene | 0.41 | 0.27 | 0.38 | 0.43 | 0.81 | 0.07 |
| m-Xylene | 0.91 | 0.60 | 0.85 | 0.96 | 1.69 | 0.35 |
| o-Xylene | 0.39 | 0.27 | 0.38 | 0.44 | 0.77 | 0.14 |
| Ethyltoluenes | 0.13 | 0.09 | 0.14 | 0.17 | 0.40 | 0.00 |
| trimethyl-benzene | 0.14 | 0.12 | 0.18 | 0.26 | 0.24 | 0.07 |
| C-10 and others | 2.17 | 1.63 | 1.09 | 1.07 | 0.90 | 0.07 |

TABLE 1-continued

| | Product distribution (wt %) | | | | | |
|---|---|---|---|---|---|---|
| | Ex. 1a | Ex. 1b | Ex. 1c | Ex. 1d | Ex. 1e | Ex. 1f |
| n-hexane conversion wt % | 99.94 | 99.95 | 99.92 | 99.76 | 99.43 | 30.67 |
| Total aromatics | 11.85 | 8.30 | 8.01 | 6.43 | 8.84 | 2.12 |

Example 2

Protonated Zeolite Y (Ex. 2) was tested at the same conditions as mentioned in example 1 and compared with example 1a as shown in Table 2.

TABLE 2

| Product distribution (wt %) | Ex. 1a | Ex. 2 |
|---|---|---|
| Methane | 7.27 | 2.812 |
| Ethylene | 1.15 | 1.868 |
| Ethane | 14.06 | 3.641 |
| Propylene + Propane | 56.92 | 9.193 |
| C4—HC | 8.67 | 11.25 |
| Hexane | 0.06 | 68.11 |
| Benzene | 2.90 | 0.21 |
| Toluene | 4.60 | 1.85 |
| Ethylbenzene | 0.21 | 0.07 |
| P-Xylene | 0.41 | 0.21 |
| m-Xylene | 0.91 | 0.57 |
| o-Xylene | 0.39 | 0.21 |
| Ethyltoluenes | 0.13 | 0.00 |
| trimethylbenzene | 0.14 | 0.00 |
| C-10 and others | 2.17 | 0.00 |
| n-hexane conversion wt % | 99.94 | 31.89 |
| Total aromatics | 11.85 | 3.13 |

Example 3

Different promoters were added to protonated Zeolite Y and texted as per condition listed in example 1 and compared with the results for example 2 as shown in Table 3. More particularly, as per example 3a, H-Zeolite-Y was promoted with 5% Lanthanum; as per example 3b, H-Zeolite-Y was promoted with 5% Lanthanum and 1% Cerium; as per example 3c, H-Zeolite-Y was promoted with Phosphorous using Phosphoric acid as source; and as per example 3d, H-Zeolite-Y was promoted with Phosphorous using Diammonium phosphate as source.

TABLE 3

| | Product distribution (wt %) | | | | |
|---|---|---|---|---|---|
| | Ex. 2 | Ex. 3a | Ex. 3b | Ex. 3c | Ex. 3d |
| Methane | 2.812 | 1.13 | 2.032 | 0.413 | 0.906 |
| Ethylene | 1.868 | 1.09 | 1.60 | 1.128 | 1.573 |
| Ethane | 3.641 | 1.46 | 2.76 | 1.092 | 1.448 |
| Propylene + Propane | 9.193 | 19.48 | 32.95 | 16.028 | 24.006 |
| C4—HC | 11.25 | 14.6 | 21.96 | 7.01 | 15.92 |
| Hexane | 68.11 | 58.1 | 37.13 | 73.42 | 54.74 |
| Benzene | 0.21 | 0.19 | 0.11 | 0.08 | 0.33 |
| Toluene | 1.85 | 1.39 | 0.53 | 0.74 | 0.42 |
| Ethylbenzene | 0.07 | 0.09 | 0.02 | 0.00 | 0.00 |
| P-Xylene | 0.21 | 0.19 | 0.07 | 0.01 | 0.04 |
| m-Xylene | 0.57 | 1.36 | 0.46 | 0.08 | 0.15 |
| o-Xylene | 0.21 | 0.39 | 0.14 | 0.00 | 0.08 |
| Ethyltoluenes | 0.00 | 0.15 | 0.06 | 0.00 | 0.00 |

TABLE 3-continued

| | Product distribution (wt %) | | | | |
|---|---|---|---|---|---|
| | Ex. 2 | Ex. 3a | Ex. 3b | Ex. 3c | Ex. 3d |
| trimethylbenzene | 0.00 | 0.25 | 0.12 | 0.00 | 0.12 |
| C-10 and others | 0.00 | 0.06 | 0.04 | 0.00 | 0.27 |
| n-hexane conversion wt % | 31.89 | 41.84 | 62.87 | 26.58 | 45.26 |
| Total aromatics | 3.13 | 4.08 | 1.56 | 0.91 | 1.40 |

Example 4

Gallium incorporated into the framework of ZSM-5 was modified to protonic form. The H-Ga-ZSM-5 with varying Si/Ga ratios were tested under the reaction conditions as listed in example 1. It may be noted that in this present example, Gallium replaces the aluminum present in the framework of ZSM-5 and is not taken as a promoter. More particularly, as per example 4a, H-Ga-ZSM-5 had Si/Ga ratio of 23; and as per example 4b, H-Ga-ZSM-5 had Si/Ga ratio of 50. The results are provided in Table 4.

TABLE 4

| Product distribution (wt %) | Ex. 4a | Ex. 4b |
|---|---|---|
| Methane | 10.19 | 1.89 |
| Ethylene | 3.93 | 7.42 |
| Ethane | 5.63 | 6.55 |
| Propylene + Propane | 24.02 | 31.03 |
| C4—HC | 10.69 | 23.62 |
| Hexane | 0.10 | 19.84 |
| Benzene | 14.98 | 0.86 |
| Toluene | 25.08 | 7.17 |
| Ethylbenzene | 0.66 | 0.17 |
| P-Xylene | 1.12 | 0.36 |
| m-Xylene | 2.27 | 0.64 |
| o-Xylene | 0.70 | 0.22 |
| Ethyltoluenes | 0.21 | 0.06 |
| trimethylbenzene | 0.04 | 0.03 |
| C-10 and others | 0.37 | 0.14 |
| n-hexane conversion wt % | 99.90 | 80.16 |
| Total aromatics | 45.43 | 9.64 |

Example 5

Gallium incorporated into the framework of ZSM-5 was modified to protonic form. The H-Ga-ZSM-5 having Si/Ga ratio of 23 (i.e. example 4a) was taken as the base material and different promoters were introduced into the same and tested under the reaction conditions as listed in example 1. More particularly, in example 5a, H-ZSM-5 having SAR of 23 was taken as the base material and 2% of Zn was added as promoter; and in example 5b, H-ZSM-5 having SAR of 23 was taken as the base material and 4% of Ga was added as promoter. The results are provided in Table 5.

TABLE 5

| Product distribution (wt %) | Ex. 5a | Ex. 5b |
|---|---|---|
| Methane | 2.27 | 7.56 |
| Ethylene | 3.25 | 3.86 |
| Ethane | 7.72 | 8.86 |
| Propylene + Propane | 19.57 | 23.96 |
| C4—HC | 16.45 | 19.47 |
| Hexane | 30.06 | 3.86 |
| Benzene | 4.36 | 7.92 |
| Toluene | 7.70 | 12.83 |

TABLE 5-continued

| Product distribution (wt %) | Ex. 5a | Ex. 5b |
|---|---|---|
| Ethylbenzene | 0.92 | 1.09 |
| P-Xylene | 2.08 | 2.83 |
| m-Xylene | 2.31 | 3.82 |
| o-Xylene | 0.88 | 1.49 |
| Ethyltoluenes | 0.46 | 0.63 |
| trimethylbenzene | 0.18 | 0.24 |
| C-10 and others | 1.80 | 1.59 |
| n-hexane conversion wt % | 69.94 | 96.14 |
| Total aromatics | 20.68 | 32.44 |

Example 6

The zeolite H-ZSM-5 with varying SiO2/Al2O3 ratios (SAR) were taken as base material and 8% Phosphorous was added and tested under the reaction conditions as listed in example 1. More particularly, in example 6a, H-ZSM-5 having SAR of 23 was taken as the base material and 8% Phosphorous was added as promoter; in example 6b, H-LSM-5 having SAR of 50 was taken as the base material and 8% Phosphorous was added as promoter; and example 6c, H-ZSM-5 having SAR of 80 was taken as the base material and 8% Phosphorous was added as promoter. The results are provided in Table 6.

TABLE 6

| Product distribution (wt %) | Ex. 6a | Ex. 6b | Ex. 6c |
|---|---|---|---|
| Methane | 2.81 | 1.30 | 1.74 |
| Ethylene | 1.81 | 6.41 | 11.17 |
| Ethane | 8.81 | 7.29 | 9.78 |
| Propylene + Propane | 56.20 | 48.56 | 47.76 |
| C4—HC | 19.01 | 34.45 | 27.63 |
| Hexane | 0.01 | 1.11 | 1.75 |
| Benzene | 1.56 | 0.29 | 0.08 |
| Toluene | 4.80 | 0.59 | 0.09 |
| Ethylbenzene | 0.30 | 0.00 | 0.00 |
| P-Xylene | 0.82 | 0.00 | 0.00 |
| m-Xylene | 1.81 | 0.00 | 0.00 |
| o-Xylene | 0.80 | 0.00 | 0.00 |
| Ethyltoluenes | 0.27 | 0.00 | 0.00 |
| trimethylbenzene | 0.19 | 0.00 | 0.00 |
| C-10 and others | 0.81 | 0.00 | 0.00 |
| n-hexane conversion wt % | 99.99 | 98.89 | 98.25 |
| Total aromatics | 11.36 | 0.88 | 0.17 |

Example 7

The zeolite H-ZSM-5 having SAR of 23 was taken as the base material and different promoters at a constant rate of 2% was added and tested under the reaction conditions as listed in example 1. More particularly, in example 7a, H-ZSM-5 having SAR of 23 was taken as the base material and 2% Cerium was added as promoter; in example 7b, H-ZSM-5 having SAR of 23 was taken as the base material and 2% Potassium was added as promoter; and in example 7c, H-ZSM-5 having SAR of 23 was taken as the base material and 2% Cesium was added as promoter. The results are provided in Table 7.

TABLE 7

| Product distribution (wt %) | Ex. 7a | Ex. 7b | Ex. 7c |
|---|---|---|---|
| Methane | 7.49 | 1.94 | 0.12 |
| Ethylene | 1.94 | 7.00 | 0.30 |

TABLE 7-continued

| Product distribution (wt %) | Ex. 7a | Ex. 7b | Ex. 7c |
|---|---|---|---|
| Ethane | 14.94 | 8.06 | 0.30 |
| Propylene + Propane | 56.38 | 50.42 | 1.86 |
| C4—HC | 10.78 | 30.72 | 2.02 |
| Hexane | 0.01 | 0.89 | 95.29 |
| Benzene | 1.90 | 0.43 | 0.12 |
| Toluene | 2.76 | 0.55 | 0.00 |
| Ethylbenzene | 0.15 | 0.00 | 0.00 |
| P-Xylene | 0.37 | 0.00 | 0.00 |
| m-Xylene | 0.82 | 0.00 | 0.00 |
| o-Xylene | 0.40 | 0.00 | 0.00 |
| Ethyltoluenes | 0.15 | 0.00 | 0.00 |
| trimethylbenzene | 0.19 | 0.00 | 0.00 |
| C-10 and others | 1.73 | 0.00 | 0.00 |
| n-hexane conversion wt % | 99.99 | 99.11 | 4.71 |
| Total aromatics | 8.47 | 0.97 | 0.12 |

Example 8

The zeolite H-ZSM-5 having SAR of 23 was taken as the base material and different concentrations of Gallium was added as promoter and tested under the reaction conditions as listed in example 1. More particularly, in example 8a, H-ZSM-5 having SAR of 23 was taken as the base material and 1% Gallium was added as promoter; in example 8b, H-ZSM-5 having SAR of 23 was taken as the base material and 2% Ga was added as promoter; in example 8c, H-ZSM-5 having SAR of 23 was taken as the base material and 6% Ga was added as promoter and in example 8d, H-ZSM-5 having SAR of 23 was taken as the base material and 8% Ga was added as promoter. The results are provided in Table 8.

TABLE 8

| Product distribution (wt %) | Ex. 8a | Ex. 8b | Ex. 8c | Ex. 8d |
|---|---|---|---|---|
| Methane | 31.91 | 22.36 | 16.71 | 19.00 |
| Ethylene | 1.54 | 0.55 | 0.56 | 0.66 |
| Ethane | 15.41 | 10.98 | 9.67 | 11.90 |
| Propylene + Propane | 16.62 | 13.03 | 10.35 | 11.75 |
| C4—HC | 0.55 | 0.27 | 0.22 | 0.24 |
| Hexane | 0.03 | 0.05 | 0.06 | 0.05 |
| Benzene | 12.20 | 13.33 | 18.21 | 15.66 |
| Toluene | 18.41 | 30.48 | 37.57 | 32.02 |
| Ethylbenzene | 0.11 | 0.18 | 0.11 | 0.10 |
| P-Xylene | 0.60 | 1.18 | 1.09 | 0.97 |
| m-Xylene | 1.41 | 2.59 | 2.46 | 2.09 |
| o-Xylene | 0.49 | 0.95 | 0.80 | 0.73 |
| Ethyltoluenes | 0.06 | 0.09 | 0.06 | 0.05 |
| trimethylbenzene | 0.09 | 0.14 | 0.06 | 0.10 |
| C-10 and others | 0.57 | 3.82 | 2.06 | 4.67 |
| n-hexane conversion wt % | 99.97 | 99.95 | 99.94 | 99.95 |
| Total aromatics | 33.94 | 52.76 | 62.43 | 56.40 |

Example 9

The zeolite H-ZSM-5 having SAR of 23 was taken as the base material and different concentrations of Zinc was added as promoter and tested under the reaction conditions as listed in example 1. More particularly, in example 9a, 1-T-ZSM-5 having SAR of 23 was taken as the base material and 1% Zn was added as promoter; in example 9b, H-ZSM-5 having SAR of 23 was taken as the base material and 2% Zn was added as promoter; in example 9c, H-ZSM-5 having SAR of 23 was taken as the base material and 3% Zn was added as promoter; in example 9d, H-ZSM-5 having SAR of 23 was taken as the base material and 4% Zn was added as promoter; and in example 9e, H-ZSM-5 having SAR of 23 was taken as the base material and 6% Zn was added as promoter. The results are provided in Table 9.

TABLE 9

| | Product distribution (wt %) | | | | |
|---|---|---|---|---|---|
| | Ex. 9a | Ex. 9b | Ex. 9c | Ex. 9d | Ex. 9e |
| Methane | 7.23 | 4.55 | 4.55 | 5.70 | 13.34 |
| Ethylene | 2.25 | 0.73 | 0.73 | 0.16 | 0.19 |
| Ethane | 13.00 | 12.22 | 12.22 | 18.85 | 40.70 |
| Propylene + Propane | 37.68 | 21.93 | 21.93 | 16.58 | 17.81 |
| C4—HC | 6.79 | 6.16 | 6.16 | 2.05 | 0.51 |
| Hexane | 0.07 | 0.53 | 0.53 | 0.61 | 0.02 |
| Benzene | 7.72 | 9.79 | 9.79 | 13.28 | 8.42 |
| Toluene | 16.36 | 23.64 | 23.64 | 26.24 | 11.60 |
| Ethylbenzene | 0.38 | 0.89 | 0.89 | 0.23 | 0.16 |
| P-Xylene | 1.19 | 3.23 | 3.23 | 3.40 | 1.30 |
| m-Xylene | 2.81 | 7.15 | 7.15 | 7.80 | 2.85 |
| o-Xylene | 1.20 | 3.26 | 3.26 | 3.50 | 1.28 |
| Ethyltoluenes | 0.11 | 0.81 | 0.81 | 0.20 | 0.03 |
| trimethylbenzene | 0.13 | 0.88 | 0.88 | 0.52 | 0.28 |
| C-10 and others | 3.06 | 4.23 | 4.23 | 0.88 | 1.51 |
| n-hexane conversion wt % | 99.93 | 99.47 | 99.47 | 99.39 | 99.98 |
| Total aromatics | 32.97 | 53.87 | 53.87 | 56.05 | 27.43 |

Example 10

The zeolite H-ZSM-5 having SAR of 23 was taken as the base material and different concentrations of promoters was added and tested under the reaction conditions as listed in example 1. More particularly, in example 10a, H-ZSM-5 having SAR of 23 was taken as the base material and 0.5% potassium and 2% Zn were added as promoters; in example 10b, H-ZSM-5 having SAR of 23 was taken as the base material and 0.5% magnesium and 2% Zn were added as promoters; and in example 10c, H-ZSM-5 having SAR of 23 was taken as the base material and 0.5% molybdenum and 2% Zn were added as promoters. The results are provided in Table 10.

TABLE 10

| Product distribution (wt %) | Ex. 10c | Ex. 10d | Ex. 10e |
|---|---|---|---|
| Methane | 8.89 | 7.47 | 10.37 |
| Ethylene | 0.61 | 0.30 | 0.45 |
| Ethane | 37.55 | 22.29 | 34.17 |
| Propylene + Propane | 41.08 | 22.75 | 29.75 |
| C4—HC | 8.74 | 3.24 | 3.28 |
| Hexane | 0.03 | 0.12 | 0.02 |
| Benzene | 2.31 | 10.42 | 6.35 |
| Toluene | 0.80 | 19.34 | 12.19 |
| Ethylbenzene | 0.00 | 0.30 | 0.05 |
| P-Xylene | 0.00 | 2.49 | 0.44 |
| m-Xylene | 0.00 | 5.50 | 1.62 |
| o-Xylene | 0.00 | 2.51 | 0.74 |
| Ethyltoluenes | 0.00 | 0.13 | 0.00 |
| trimethylbenzene | 0.00 | 0.60 | 0.00 |
| C-10 and others | 0.00 | 2.54 | 0.56 |
| n-hexane conversion wt % | 99.97 | 99.88 | 99.98 |
| Total aromatics | 3.11 | 43.83 | 21.96 |

Example 11

The zeolite H-ZSM-5 having SAR of 23 was taken as the base material and different concentrations of promoters was added and tested under the reaction conditions as listed in example 1. More particularly, in example 11a, H-ZSM-5 having SAR of 23 was taken as the base material and 1% Zn and 2% Ga were added as promoters; in example 11b, H-ZSM-5 having SAR of 23 was taken as the base material and 2% Zn and 2% Ga were added as promoters; in example 11c, H-ZSM-5 having SAR of 23 was taken as the base material and 2% Zn and 4% Ga were added as promoters; and in example 11d, H-ZSM-5 having SAR of 23 was taken as the base material and 4% Zn and 4% Ga were added as promoters. The results are provided in Table 11.

TABLE 11

| Product distribution (wt %) | Ex. 11a | Ex. 11b | Ex. 11c | Ex. 11d |
|---|---|---|---|---|
| Methane | 11.12 | 9.48 | 7.01 | 6.02 |
| Ethylene | 1.02 | 1.41 | 1.90 | 1.21 |
| Ethane | 8.54 | 9.26 | 9.04 | 6.70 |
| Propylene + Propane | 17.75 | 23.95 | 33.75 | 22.74 |
| C4—HC | 0.93 | 4.49 | 15.51 | 5.40 |
| Hexane | 0.13 | 0.11 | 0.87 | 0.42 |
| Benzene | 14.27 | 11.35 | 5.55 | 10.83 |
| Toluene | 27.52 | 23.22 | 14.40 | 26.01 |
| Ethylbenzene | 0.41 | 0.57 | 0.74 | 0.64 |
| P-Xylene | 2.91 | 2.92 | 2.06 | 3.27 |
| m-Xylene | 6.41 | 6.38 | 4.25 | 7.07 |
| o-Xylene | 3.00 | 2.92 | 1.90 | 3.20 |
| Ethyltoluenes | 0.31 | 0.46 | 0.72 | 0.60 |
| trimethylbenzene | 0.56 | 0.58 | 0.40 | 0.70 |
| C-10 and others | 5.11 | 2.90 | 1.90 | 5.20 |
| n-hexane conversion wt % | 99.87 | 99.89 | 99.13 | 99.58 |
| Total aromatics | 60.50 | 51.31 | 31.91 | 57.51 |

Example 12

The zeolite crystals of example 11a were formed as extrudates with a diluent such as alumina along with peptizing agent such as nitric acid and fillers such as clays to obtain extrudates. Such extrudates were tested under the reaction conditions as listed in example 1. Particularly, in example 12a, 70% of zeolite crystals of example 11a were mixed with 30% of diluents and fillers and formed as extrudates and tested; in example 12b, 30% of zeolite crystals of example 11a were mixed with 30% of diluents and fillers and formed as extrudates and tested; in example 12c, 40% of zeolite crystals of example 11a were mixed with 60% of diluents and fillers and formed as extrudates and tested; and in example 12d, 60% of zeolite crystals of example 11a were mixed with 40% of diluents and fillers and formed as extrudates and tested. The results are provided in Table 12.

TABLE 12

| Product distribution (wt %) | Ex. 12a | Ex. 12b | Ex. 12c | Ex. 12d |
|---|---|---|---|---|
| Methane | 5.98 | 5.30 | 8.66 | 4.54 |
| Ethylene | 1.88 | 4.92 | 2.21 | 4.46 |
| Ethane | 3.84 | 3.54 | 4.80 | 3.61 |
| Propylene + Propane | 19.02 | 19.81 | 17.68 | 18.83 |
| C4—HC | 7.51 | 14.65 | 3.06 | 11.80 |
| Light alkanes (C-5-HC) | 0.50 | 1.53 | 0.18 | 3.82 |
| Benzene | 10.22 | 7.34 | 12.89 | 8.60 |
| Toluene | 27.56 | 23.11 | 28.02 | 23.18 |
| Ethylbenzene | 0.80 | 1.02 | 0.65 | 0.98 |
| P-Xylene | 3.74 | 3.42 | 3.30 | 3.49 |
| m-Xylene | 8.19 | 7.07 | 7.25 | 7.27 |
| o-Xylene | 3.70 | 3.05 | 3.36 | 3.19 |
| Ethyltoluenes | 0.85 | 1.01 | 0.60 | 1.00 |
| trimethylbenzene | 1.03 | 0.90 | 0.75 | 0.92 |
| C-10 and others | 5.18 | 3.34 | 6.60 | 4.32 |
| n-hexane conversion wt % | 99.50 | 98.47 | 99.82 | 96.18 |
| Total aromatics | 61.27 | 50.25 | 63.42 | 52.95 |

Example 13

The zeolite crystals of example 11a were taken as base material and further loaded with one or more transition metal as promoter and tested under the reaction conditions as listed in example 1. Particularly, in example 13a, zeolite crystals of example 11a were loaded with 0.5% Cerium; in example 13b, zeolite crystals of example 11a were loaded with 0.5% Tin; in example 13c, zeolite crystals of example 11a were loaded with 0.5% Chromium; and in example 13d, zeolite crystals of example 11a were loaded with 0.5% of Cerium, 0.5% of Tin and 0.5% of Chromium. The results are provided in Table 13.

TABLE 13

| Product distribution (wt %) | Ex. 13a | Ex. 13b | Ex. 13c | Ex. 13d |
|---|---|---|---|---|
| Methane | 4.64 | 4.67 | 11.11 | 9.60 |
| Ethylene | 1.02 | 1.62 | 1.13 | 2.65 |
| Ethane | 2.59 | 2.45 | 5.91 | 7.76 |
| Propylene + Propane | 11.25 | 11.74 | 22.73 | 17.40 |
| C4—HC | 8.48 | 13.57 | 5.44 | 7.99 |
| Light alkanes (C-5-HC) | 2.17 | 2.14 | 0.18 | 0.55 |
| Benzene | 28.80 | 20.78 | 11.64 | 11.24 |
| Toluene | 28.76 | 28.55 | 23.11 | 23.17 |
| Ethylbenzene | 0.41 | 0.77 | 0.39 | 0.79 |
| P-Xylene | 2.22 | 2.55 | 2.90 | 3.10 |
| m-Xylene | 4.83 | 5.45 | 6.41 | 7.04 |
| o-Xylene | 2.12 | 2.36 | 2.90 | 3.07 |
| Ethyltoluenes | 0.27 | 0.55 | 0.42 | 0.76 |
| trimethylbenzene | 0.44 | 0.75 | 0.71 | 1.06 |
| C-10 and others | 2.00 | 2.06 | 5.02 | 3.81 |
| n-hexane conversion wt % | 97.83 | 97.86 | 99.82 | 99.45 |
| Total aromatics | 69.85 | 63.82 | 53.51 | 54.03 |

Example 14

In the following example, the effect of different feedstock was studied over the catalyst composition listed in example 11a. More particularly, in example 14a, the catalyst composition as described in example 11a was used with respect to a feedstock comprising n-pentane; in example 14b, the catalyst composition as described in example 11a was used with respect to a feedstock comprising a mixture of n-pentane and n-hexane (in a ratio of 1:1); in example 14c, the catalyst composition as described in example 11a was used with respect to a feedstock comprising n-hexane; in example 14d, the catalyst composition as described in example 11a was used with respect to a feedstock comprising n-heptane (in a ratio of 1:1); in example 14e, the catalyst composition as described in example 11a was used with respect to a refinery light naphtha denoted by "FS-01" whose composition details are provided in Table 14; and in example 14f, the catalyst composition as described in example 11a was used with respect to a refinery light naphtha denoted by "FS-02" whose composition details are provided in Table 14. The results of these experiments are provided in Table 15.

TABLE 14

| Reactant distribution (wt %) | FS-01 | FS-02 |
|---|---|---|
| C4 | 0.41 | — |
| Isopentane | 31.88 (C5) | 18.38 |
| n-pentane | | 24.11 |
| 2-methyl pentane | 56.37 (C6) | 12.92 |
| n-hexane | | 21.04 |
| Methyl cyclopentane | | 13.31 |
| Cyclohexane | | 9.99 |
| heptane | 11.34 | 0.27 |

TABLE 15

Product distribution (wt %)
Catalyst: Example: 11a

| Feed | Ex. 14a | Ex. 14b | Ex. 14c | Ex. 14d | Ex. 14e | Ex. 14f |
|---|---|---|---|---|---|---|
| Methane | 10.73 | 11.02 | 6.86 | 14.26 | 7.73 | 8.96 |
| Ethylene | 1.23 | 1.29 | 1.28 | 2.67 | 1.23 | 2.24 |
| Ethane | 8.67 | 8.65 | 5.09 | 8.07 | 4.39 | 8.11 |
| Propylene + Propane | 23.84 | 17.89 | 14.86 | 22.45 | 17.64 | 24.96 |
| C4—HC | 5.65 | 2.10 | 1.62 | 2.77 | 3.70 | 4.03 |
| Light alkanes (C-5-HC) | 0.22 | 0.17 | 0.11 | 0.13 | 0.53 | 0.33 |
| Benzene | 9.24 | 13.99 | 16.81 | 12.68 | 11.32 | 10.03 |
| Toluene | 21.41 | 27.23 | 31.50 | 21.90 | 28.11 | 22.40 |
| Ethylbenzene | 0.44 | 0.53 | 0.44 | 0.22 | 0.71 | 0.54 |
| P-Xylene | 2.90 | 2.86 | 3.24 | 1.89 | 3.85 | 2.58 |
| m-Xylene | 6.39 | 6.25 | 7.14 | 5.01 | 8.45 | 6.59 |
| o-Xylene | 2.89 | 2.87 | 3.36 | 2.22 | 3.86 | 2.87 |
| Ethyltoluenes | 0.49 | 0.39 | 0.34 | 0.27 | 0.78 | 0.61 |
| trimethyl-benzene | 0.62 | 0.49 | 0.63 | 0.38 | 1.69 | 0.59 |
| C-10 and others | 5.26 | 4.28 | 6.73 | 5.08 | 6.01 | 5.15 |
| n-hexane conversion wt % | 99.78 | 99.83 | 99.89 | 99.87 | 99.47 | 99.67 |
| Total aromatics | 49.65 | 58.89 | 70.19 | 49.66 | 64.79 | 51.36 |

Example 15

In the following example, the effect of carrier different feedstock was studied over the catalyst composition listed in example 11a. More particularly, in example 15a, no carrier gas was used; in example 15b, a carrier gas comprising Nitrogen was used, wherein the nitrogen to hydrocarbon ratio was maintained at 5; in example 15c, a carrier gas comprising Nitrogen and hydrogen (in a ratio of 1:1) was used, wherein the carrier gas to hydrocarbon ratio was maintained at 5; in example 15d, a carrier gas comprising Nitrogen and hydrogen (in a ratio of 4:1) was used, wherein the carrier gas to hydrocarbon ratio was maintained at 5; and in example 15e, a carrier gas comprising Nitrogen and hydrogen (in a ratio of 1:4) was used, wherein the carrier gas to hydrocarbon ratio was maintained at 5. The results of these experiments are provided in Table 16.

TABLE 16

Product distribution (wt %)

| | Ex. 15a | Ex. 15b | Ex. 15c | Ex. 15d | Ex. 15e |
|---|---|---|---|---|---|
| Methane | 8.87 | 6.86 | 8.64 | 7.26 | 8.07 |
| Ethylene | 1.39 | 1.28 | 2.15 | 2.35 | 2.21 |
| Ethane | 6.92 | 5.09 | 8.10 | 7.13 | 7.30 |
| Propylene+ | 18.24 | 14.86 | 30.85 | 28.94 | 30.96 |
| C4—HC | 2.87 | 1.62 | 10.51 | 11.76 | 13.85 |
| Hexane | 0.30 | 0.11 | 0.25 | 0.28 | 0.24 |
| Benzene | 12.57 | 16.81 | 7.39 | 7.67 | 6.72 |
| Toluene | 27.32 | 31.50 | 18.25 | 19.39 | 17.18 |
| Ethylbenzene | 0.61 | 0.44 | 0.70 | 0.77 | 0.64 |
| P-Xylene | 3.34 | 3.24 | 2.41 | 2.56 | 2.24 |
| m-Xylene | 7.27 | 7.14 | 5.31 | 5.62 | 4.94 |

TABLE 16-continued

| | Product distribution (wt %) | | | | |
|---|---|---|---|---|---|
| | Ex. 15a | Ex. 15b | Ex. 15c | Ex. 15d | Ex. 15e |
| o-Xylene | 3.34 | 3.36 | 2.42 | 2.55 | 2.25 |
| Ethyltoluenes | 0.57 | 0.34 | 0.63 | 0.75 | 0.59 |
| trimethylbenzene | 0.70 | 0.63 | 0.16 | 0.57 | 0.50 |
| C-10 and others | 5.69 | 6.73 | 2.24 | 2.39 | 2.31 |
| n-hexane | 99.70 | 99.89 | 99.75 | 99.72 | 99.76 |
| Total aromatics | 61.41 | 70.19 | 39.51 | 42.28 | 37.37 |

Example 16

In the following example, the effect of carrier different feedstock was studied over the catalyst composition listed in example 11a. More particularly, in example 16a, hydrogen was used as a carrier gas and a ratio between the carrier gas to the hydrocarbon was varied between about 0 to 2; in example 16b, nitrogen was used as a carrier gas and a ratio between the carrier gas to the hydrocarbon was varied between about 0 to 15. The results of these experiments are shown in the form of FIG. 1. More particularly, curve 100 sows the variation in terms of production of aromatic yield for different ratios of hydrogen to hydrocarbon feedstock, when hydrogen is used as the carrier gas and curve 200 shows the variation in terms of production of aromatic yield for different ratios of nitrogen to hydrocarbon feedstock, when nitrogen is used as the carrier gas.

From the foregoing description, one skilled in the art can easily ascertain the essential characteristics of this invention and, without departing from the spirit and scope thereof, can make various changes and modifications of the invention to adapt it to various usages and conditions.

We claim:

1. A catalyst composition suitable for converting light naphtha comprising one or more of C5 to C8 carbon atoms to aromatic compounds ranging from C6 to C10 carbon atoms, said catalyst composition comprising:
    (a) a hydrogen form medium pore size alumino silicate zeolite that has a pore size of 5-6 Å;
    (b) 0.1 to 5.0 wt % of zinc associated with the zeolite as a promotor;
    (c) 0.1 to 5 wt % of gallium associated with the zeolite as a promotor; and
    (d) 0.5 to 1.5 wt % of one or more additional promoters associated with the zeolite, wherein the one or more additional promotors are selected from the group consisting of cerium, tin, cesium, potassium, magnesium, and mixtures thereof.

2. The catalyst composition as claimed in claim 1, wherein the hydrogen form medium pore alumino silicate zeolite has silica to alumina ratio (SAR) in the range of 20 to 200.

3. The catalyst composition as claimed in claim 1, wherein the catalyst composition optionally further comprises a binder material and a filler material.

4. The catalyst composition as claimed in claim 3, wherein the binder material is selected from a group comprising of alumina, silica, silica-alumina and phosphate.

5. The catalyst composition as claimed in claim 3, wherein the filler material is selected from a group comprising of kaolin clay, montmorillnite clay, bentonites clay, laolinite clay and halloysite clay, aluminum trihydrate, bayerite, and gamma alumina.

6. The catalyst composition as claimed in claim 1, wherein the catalyst composition is in the form of spheres, rods, pills, pellets, tablets, granules, cylindrical or multilobe extrudates.

7. The catalyst composition as claimed in claim 1, wherein, the catalyst has 0.5 to 4.0 wt % of zinc and 0.5 to 4 wt % of gallium.

8. The catalyst composition as claimed in claim 1, wherein the catalyst has 1.0 to 3.0 wt % of zinc and 1.0 to 4 wt % of gallium.

9. A process for converting light naphtha comprising one or more of C5 to C8 carbon atoms to aromatic compounds ranging from C6 to C10 carbon atoms, said process comprising the step of contacting a feedstock comprising the light naphtha with a catalyst composition comprising:
    (a) hydrogen form medium pore size alumino silicate zeolite that has a pore size of 5-6 Å;
    (b) 0.1 to 5.0 wt % of zinc associated with the zeolite as a promotor;
    (c) 0.1 to 5 wt % of gallium associated with the zeolite as a promotor; and
    (d) 0.5 to 1.5 wt % of one or more additional promoters associated with the zeolite, wherein the one or more additional promotors are selected from the group consisting of cerium, tin, cesium, potassium, magnesium, and mixtures thereof,
    wherein the contacting of the feedstock with the catalyst is in presence of carrier gas at temperatures ranging from 400° to 600° C.;
    wherein the carrier gas is supplied in an amount of 2 to 10 moles per mole of hydrocarbon feedstock;
    wherein the catalyst is maintained in a fixed bed of a down-flow reactor;
    wherein the carrier gas comprises nitrogen, hydrogen, or mixtures thereof.

10. The process as claimed in claim 9, wherein a weight hourly space velocity (WHSV) in the range of 0.5 to 2 hour$^{-1}$ is maintained.

* * * * *